Patented Mar. 30, 1937

2,075,371

UNITED STATES PATENT OFFICE 2,075,371

PROCESS FOR DYEING ANIMAL FIBERS AND COMPOSITION OF MATTER FOR SAID PURPOSE

Fritz Straub, Fritz Grether, and Charles Graenacher, Basel, Switzerland, assignors to the firm of Society of Chemical Industry in Basle, Basel, Switzerland No Drawing. Application June 7, 1934, Serial No. 729,518. In Switzerland June 9, 1933

7 Claims. (Cl. 8—6)

This invention is an improvement in or a modification of that described in application Serial No. 718,083 filed March 29, 1934.

There is known a series of lyophile unsulfonated dispersing agents characterized on the one hand by containing in the same cation at least one basic nitrogen atom and at least one aliphatic radical consisting of at least 8 carbon atoms, the term aliphatic radical comprising both open and cyclic chains, such as inter alia decyl, dodecyl, heptadecyl radicals, or the radicals which correspond to the naphthene hydrocarbons, and on the other hand by their tendency to combine with dyestuffs containing sulfo-groups.

Such products are, for example, the trimethylammonium sulfomethylate of mono-stearoyl-para-phenylenediamine of the formula

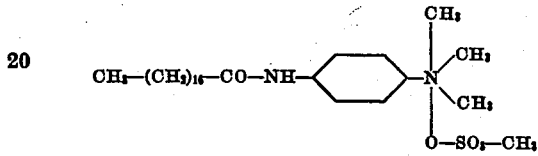

(cf. German Patent No. 559,500, Example 10) the trimethylammoniumsulfomethylate of mono-oleyl-para-phenylenediamine, the trimethylammoniumsulfomethylate of mono-stearoylethylenediamine, the trimethylammoniumsulfomethylate of mono-oleylethylenediamine of the formula

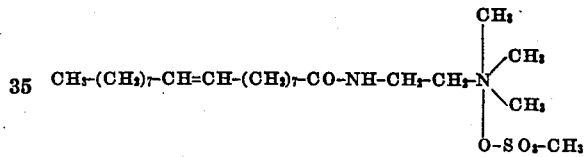

the hydrochloride of diethylcetylamine of the formula

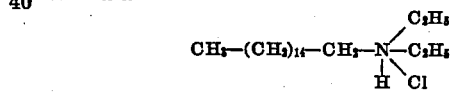

(cf. Reychler, "Chemisches Zentralblatt" published by the Deutsche Chemische Gesellschaft, 1913, II, page 1377, line 2) the dimethyloctodecylaminehydrochloride of the formula

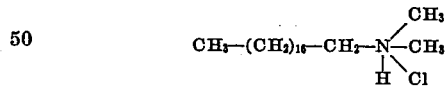

the sulfomethylate of octodecyltrimethylammonium, the hydrochloride of pentadecyldihydroimidazole, the cetylpyridinium chloride or bromide; further the unsulfonated cyclic amidines, which are in part new, described in applications Serial Nos. 667,133 filed April 20, 1933, and 727,584 filed May 25, 1934. There also come into the series compounds in which the nitrogenous and the aliphatic radicals containing at least 8 carbon atoms are linked with each other in the manner of an ester or an ether. Such products are, for instance, the mixed ether of cetyl-alcohol and N-hydroxymethylpyridinium chloride, the ester from stearic acid and dimethyl- or diethylaminoethanol of the formula

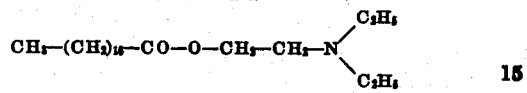

the stearylcholine hydrochloride and the corresponding benzyl compound, the palmitic acid ester of 1-hydroxyphenyl-3-trimethylammonium chloride of the formula

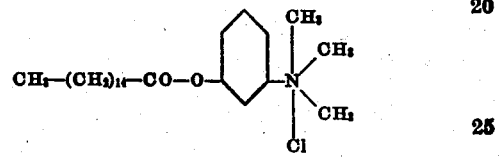

the stearic acid ester of hydroxyethylpyridinium chloride of the formula

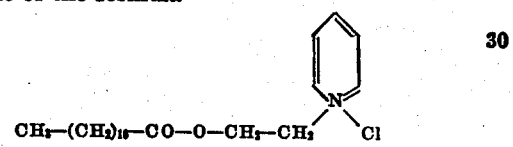

the hydrochloride of diethylaminoethyloctodecylcarbonate, the stearic acid ester of the addition product of glycerine-mono-chlorhydrin of the formula

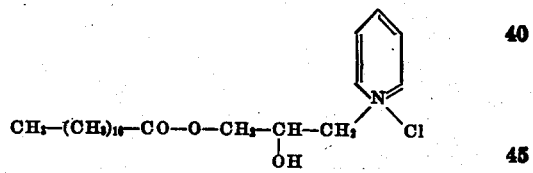

or of α, α'-glycerinedichlorhydrin and pyridine or the like. In all these compounds the stearic acid radical and the palmitic acid radical may be exchanged for other acid radicals, for instance that of oleic acid, capric acid, lauric acid, myristic acid or ricinoleic acid. Furthermore, the alcoholic radical, such as that of cetyl alcohol, may be replaced by the radical of the alcohol corresponding with one or other of the aforesaid acids, such as the oleyl alcohol. Finally, derivatives of complex amines may be used, such as derivatives of diethylenetriamine, triethylenetetramine or the like. All these products neither contain sulfo-groups nor carboxyl-groups, but in the form of the salts which they form with acids, due to the presence of the basic N-atom, they are lyophile. If they are quaternary ammonium compounds, they may be lyophile also in the form of the free bases.

These products render excellent service in dye-baths working with such dyestuffs which are being dyed in the presence of acetic acid, which definition means dyestuffs which may be dyed in an acetic acid bath as well as dyestuffs in the dyeing of which the acetic acid is used in the form of ammonium acetate which, as is known, splits off acetic acid in hot dye-baths due to the hydrolysis (cf. the dyeing of dyestuffs of the type of the dyestuff No. 552 of Schultz, Farbstofftabellen, 7th edition, 1931), and also dyestuffs which are first dyed in an acetic acid bath and to which sulfuric acid is added in the course or at the end of the further process, as is the case for example in the dyestuff No. 300 of the said Farbstofftabellen. All these dyestuffs have the common feature that they are dyed at the beginning preferably in an acetic acid bath, the acidity of which may vary within wide limits. However, if these dispersing agents are used in such proportion as is usual for textile assistants, that is to say in proportions of 1-10 per cent. of the goods to be dyed, there are obtained useless, and in many cases, directly injurious results. If they are used in essentially smaller proportions than has hitherto been usual with such assistants they improve the affinity of the dyestuff in that there are obtained, for example, more vivid or fuller tints than without the assistant. The invention is particularly applicable in dyeing wool and silk, and valuable, even surprising, effects may be obtained with very different dyestuffs. By their use the fastness to light of the dyeings produced, particularly when using azo-dyestuffs, is also very often considerably improved.

The process may consist in adding to the dye-bath a small proportion, i. e. less than 1 per cent. calculated on the weight of the fiber to be dyed, of one of the aforesaid dispersing agents. As a rule quantities of 0.1 to 0.2 per cent will suffice. With certain dispersing agents or with certain dyestuffs it may also be of advantage to use more of the dispersing agent, for example 0.5 to 0.9 per cent.

The invention may also be applied by mixing a small proportion of one of the lyophile dispersing agents in question with the suitable dyestuff. The dyestuff preparation thus obtained, when used in an acid dye-bath, yields the same effects as the dye-bath does when the assistant has been added to it. Similar effects may be obtained in printing.

Among the dyestuffs in question are those known to dye in an acetic acid bath which belong to the groups of dyestuffs numbered as follows in Schultz, Farbstofftabellen, 7th edition, 1931, namely:—120, 123, 247, 248, 298, 299, 300, 303, 552, 578, 588, 590, 591, 592, 594, 599, 600, etc.; also the more recent dyestuffs dyeing in an acid bath, such as those described in the following German specifications, Nos. 270,831; 261,047; 286,091; 325,062; 398,792; 329,651 and French specification No. 479,998. The effects obtained are independent of the constitution of the dyestuff.

The following examples illustrate the invention and show that valuable results are also obtainable with dyestuffs of the azine, triphenylmethane and anthraquinone series; the parts are by weight:—

Example 1

10 parts of wool are dyed in a bath consisting of 400 parts of water, 1 part of crystallized sodium sulfate, 0.4 part of acetic acid and 0.5 part of the dyestuff obtainable by coupling diazotized α-naphthylamine with 1-hydroxynaphthalene-3:6-disulfonic acid and 0.01 part of trimethyl-ammonium-sulfate of mono-stearoylethylenediamine of the formula

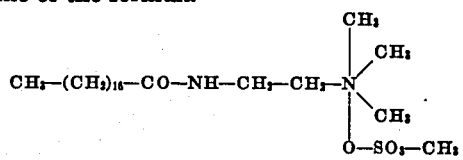

The operation consists in entering the goods at 60° C., heating the bath to boiling in the course of 1 hour and continuing the boiling for a further hour. There is obtained a red dyeing considerably more pure and deeper than is obtained without the addition of the stearoyl-ethylenediamino-derivative.

Example 2

10 parts of wool are dyed in a bath consisting of 400 parts of water, 1 part of crystallized sodium sulfate, 0.4 part of acetic acid and 0.05 part of the dyestuff obtainable by condensing 1 mol. benzaldehyde with 2 moles ethylbenzylaniline, sulfonating the condensation product, oxidizing the leuco-body and causing the latter to react with para-phenetidine and 0.01 part of the N-dihydroxypropylimidazole, obtainable by treating µ-heptadecylbenzimidazole with glycerine-chlorhydrine of the formula

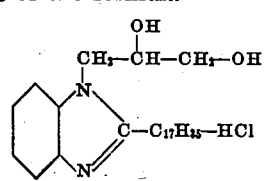

The operation consists in entering the goods at 60° C., heating the bath to the boil within half-an-hour and continuing boiling for a further hour. The blue produced is considerably more vivid and deeper than that obtained without the addition of the imidazole-derivative.

Like results are obtained with the disulfonic acids of the symmetrical 1:4-di-(4'-4''-dimethyl) - phenyl - aminoanthraquinone, which dyes green, and with the 2:7-disulfonic acid of the β:6-dephenylnaphthopenonesafranine, which dyes blue.

Example 3

100 parts of a finely powdered Standard black, consisting of the black diazo-dyestuff obtainable by coupling in acid medium and then in alkaline medium 1 mol. of 4-nitrodiazobenzene and 1 mol. diazobenzene with 1 mol. of 1-amino-8-hydroxy-naphthalene-3:6-disulfonic acid, of the Orange dyestuff No. 189, Schultz, Farbstofftabellen 1931, 7th edition, and of the Red dyestuff No. 120, of the same Farbstofftabellen, are stirred in a convenient mixing vessel heated to 100° C., and at the same time there is caused to flow gradually or there is sprayed into the vessel 20 parts of an alcoholic solution of 10 per cent. strength of the mixture of the hydrochlorides of N-dihydroxy-propylimidazoles, which is obtainable by treating with glycerine chlorhydrine the benzimidazole mixture highly alkylated at the μ-carbon atom, which is itself produced by heating ortho-phenylene-diamine with hydrogenated fish oil.

There is obtained a dry dyestuff powder which dyes wool a strikingly fuller and deeper shade than is obtainable with the dyestuff which has not been treated in the foregoing manner.

*Example 4*

100 parts of finely powdered azo-dyestuff from diazotized 1-amino-8-hydroxynaphthalene-3:6-disulfonic acid and 1-phenylaminonaphthalene-8-sulfonic acid are made into a paste, in a suitable mixing vessel capable of being heated, with 50 parts of alcohol; the paste is mixed with 15 parts of an alcoholic solution containing 4 per cent. of phosphoric acid and 10 per cent. of the mixture of the hydrochlorides of the N-dihydroxypropyl-imidazoles, which is obtained by treating with glycerine chlorhydrine the mixture of benzimidazoles highly alkylated at the μ-carbon atom, which is produced by heating orthophenylenediamine with a mixture of fats from hydrogenated fish oil, coconut oil and olive oil; the whole is then dried, while stirring, and powdered. The product is a dry dyestuff powder, which is not sticky; its dyeings on wool have a strikingly fuller and deeper shade than is produced by the parent dyestuff which has not been treated.

The procedure is similar with the other dyestuffs described in the introduction and in the examples. The compositions of matter of Examples 3 and 4 may vary with regard to their content of lyophile dispersing agent. As a rule it is advisable to use less than 10 per cent. of the weight of the dyestuff of the lyophile dipersing agent. Amounts which do not exceed 5 per cent. have proved particularly successful, as for example 5 per cent., 4 per cent., 3 per cent., 2 per cent. or 1 per cent. The amounts depend on the nature of the dyestuff.

*Example 5*

A dye-bath for dyeing 10 parts of wool is prepared with 300 parts of water of 60° C., 0.4 part of acetic acid of 40 per cent. strength, 0.01 to 0.015 part of a mixture of N-hydroxy-alkylated imidazoles, obtained by causing a mixture of glycerine chlorhydrine and ethylene chlorhydrine to react on the imidazole which is itself formed by heating ortho-phenylene diamine with coconut oil, and a solution of 0.4 part of the dyestuff No. 300 of Schultz, Farbstofftabellen, 7th edition, 1931. The whole is then made up to 400 parts, the 10 parts of wetted wool are introduced and the bath heated to the boil within ¾ hour, whereupon feebly boiling is continued for 1 hour. In order to better exhaust the dye-bath there is added after a one hour's boil 0.1 part of sulfuric acid of 66° Bé. and dyeing is continued for a further 20 minutes. The wool is then thoroughly rinsed and dried. There is obtained a deep black dyeing which is considerably deeper than the same dyeing dyed without addition of the auxiliary agent. The fastness to light of the dyeing is also considerably better than that of an equally strong dyeing produced without addition of the auxiliary agent.

What we claim is:—

1. A process for dyeing animal fibers with such acid wool dyestuffs which are dyed in the first phase of the dyeing process in a bath rendered acid with acetic acid, consisting in adding to the dye-bath 0.1 to 0.2 per cent. of the weight of the wool to be dyed of a lyophile dispersing agent consisting of a lyophile salt of a benzimidazole substituted at the μ-carbon atom by an open aliphatic chain consisting of at least 8 carbon atoms.

2. A process for dyeing animal fibers with such acid azo-dyestuffs for wool which are dyed in the first phase of the dyeing process in a bath rendered acid with acetic acid, consisting in adding to the dye-bath 0.1 to 0.2 per cent. of the weight of the wool to be dyed of a lyophile dispersing agent consisting of a lyophile salt of a benzimidazole substituted at the μ-carbon atom by an open aliphatic chain consisting of at least 8 carbon atoms.

3. A process for dyeing animal fibers with such acid wool dyestuffs which are dyed in the first phase of the dyeing process in a bath rendered acid with acetic acid, consisting in adding to the dye-bath 0.1 to 0.2 per cent. of the weight of the wool to be dyed of a lyophile dispersing agent consisting of a lyophile salt of an N-alkylated benzimidazole substituted at the μ-carbon atom by an open aliphatic chain consisting of at least 8 carbon atoms.

4. A process for dyeing animal fibers with such acid azo-dyestuffs for wool which are dyed in the first phase of the dyeing process in a bath rendered acid with acetic acid, consisting in adding to the dye-bath 0.1 to 0.2 per cent. of the weight of the wool to be dyed of a lyophile dispersing agent consisting of a lyophile salt of an N-alkylated benzimidazole substituted at the μ-carbon atom by open aliphatic chain consisting of at least 8 carbon atoms.

5. A composition of matter, characterized by a content of such an acid wool dyestuff which is dyed in the first phase of the dyeing process in a bath rendered acid with acetic acid, and of at the most 5 per cent. of the weight of the dyestuff of a lyophile dispersing agent consisting of a lyophile salt of a benzimidazole substituted at the μ-carbon atom by an open aliphatic chain consisting of at least 8 carbon atoms.

6. A composition of matter, characterized by a content of such an acid azo-dyestuff for wool which is dyed in the first phase of the dyeing process in a bath rendered acid with acetic acid, and of at the most 5 per cent. of the weight of the dyestuff of a lyophile dispersing agent, consisting of a lyophile salt of a benzimidazole substituted at the μ-carbon atom by an open aliphatic chain consisting of at least 8 carbon atoms.

7. A composition of matter, characterized by a content of such an acid azo-dyestuff for wool which is dyed in the first phase of the dyeing process in a bath rendered acid with acetic acid, and of at the most 5 per cent. of the weight of the dyestuff of a lyophile dispersing agent, consisting of a lyophile salt of an N-alkylated benzimidazole substituted at the μ-carbon atom by an open aliphatic chain consisting of at least 8 carbon atoms.

FRITZ STRAUB.
FRITZ GRETHER.
CHARLES GRAENACHER.